(12) United States Patent
Duclos

(10) Patent No.: US 6,911,251 B2
(45) Date of Patent: Jun. 28, 2005

(54) COMPOSITE SCINTILLATOR MATERIAL AND METHOD OF MANUFACTURE

(75) Inventor: Steven Jude Duclos, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 658 days.

(21) Appl. No.: 10/097,527

(22) Filed: Mar. 15, 2002

(65) Prior Publication Data

US 2002/0102395 A1 Aug. 1, 2002

Related U.S. Application Data

(62) Division of application No. 09/306,027, filed on May 6, 1999.

(51) Int. Cl.[7] .............................................. B32B 17/12
(52) U.S. Cl. ................................ 428/293.4; 428/293.7; 428/294.1; 428/294.4; 250/316 R; 252/301.17; 252/301.18; 252/301.4 R; 252/301.4 S; 252/301.4 F; 501/152
(58) Field of Search ......................... 428/293.4, 293.7, 428/294.1, 294.4; 250/316 R; 252/301.17, 301.18, 301.4 R, 301.4 S, 301.4 F; 501/152

(56) References Cited

U.S. PATENT DOCUMENTS

| 4,473,513 A | 9/1984 | Cusano et al. |
| 4,518,546 A | 5/1985 | Grekovich et al. |
| 4,591,232 A * | 5/1986 | Jeskey ........................ 385/120 |
| 4,769,353 A | 9/1988 | Grekovich et al. |
| 5,521,387 A | 5/1996 | Riedner et al. |

FOREIGN PATENT DOCUMENTS

| DE | 09709690 | 9/1998 |
| DE | 09709691 | 9/1998 |

* cited by examiner

Primary Examiner—Edward J. Cain
(74) Attorney, Agent, or Firm—Jean K. Testa; Christian G. Cabou

(57) ABSTRACT

An optically nonisotropic composite material. The composite material includes two materials, a transparent bulk optical material and radiation absorbing or reflecting fibers embedded within the bulk material. The fibers are substantially parallel to one another and tend to channel the radiation along the direction of the fibers. The bulk material may be a scintillator, in which case the fibers will tend to channel scintillating radiation along the direction of the fibers. The composite material may be used in a high spatial resolution x-ray device, such as a CT scanner. The composite material may also be used in an electromagnetic radiation detection device. Advantageously, the fibers tend to channel radiation along the fibers towards photodetector cells of the radiation detection device thereby increasing spatial resolution. The composite material may be made by forming powder around sacrificial fibers and isostatic pressing, followed by removing the sacrificial fibers, sintering to form a transparent bulk material with holes, and then filling the holes with the reflecting or absorbing fiber material.

22 Claims, 5 Drawing Sheets

COMPOSITE SCINTILLATOR MATERIAL AND METHOD OF MANUFACTURE

This application is a division of application Ser. No. 09/306,027, filed May 6, 1999 which is hereby incorporated by reference in its entirety.

FIELD OF THE INVENTION

The present invention is directed to a composite optically nonisotropic material, a method of manufacturing composite optically nonisotropic materials, and to devices using composite optically nonisotropic materials for optical detection. The invention is also directed to a composite optically nonisotropic material where the composite material includes a transparent polycrystalline ceramic material, such as an x-ray scintillator material.

BACKGROUND

Medical diagnostics and industrial inspection require high spatial resolution detection of x-rays transmitted through a body. For example in a typical computed tomography (CT) scanning system, an x-ray source and an x-ray detector array are positioned on opposite sides of the subject and rotated around the subject in fixed relation to each other. In a CT scanning system using a solid scintillator, the scintillator material of a cell or element absorbs x-rays incident on that cell and emits light which is collected by a photodetector for that cell. Thus, the x-rays, the electromagnetic radiation of interest, stimulate or excite the scintillator material, which then emits scintillating radiation, e.g., light. During data collection, each cell or element of the detector array provides an electrical output signal representative of the present light intensity in that cell of the array. These output signals are processed to create an image of the subject in a manner which is well known in the CT scanner art.

It is desirable to absorb substantially all of the incident x-rays in the scintillator material in order to minimize the x-ray dose to which the body must be exposed during the diagnostic or inspection x-ray measurement. In order to collect substantially all of the incident x-rays, the scintillator material must have a thickness in the direction of x-ray travel which is sufficient to stop substantially all of the x-rays. This thickness depends both on the energy of the x-rays and on the x-ray stopping power of the scintillator material.

As the thickness of the scintillator increases, its transparency to the generated light must also increase so that substantially all of the light generated by the x-rays in the scintillator is collected by the photodetector. Collecting all the light generated by the x-rays maximizes overall system efficiency, the signal to noise ratio, and the accuracy with which the quantity of incident stimulating radiation, i.e., x-rays, may be measured. Furthermore, as the scintillator thickness increases, light generated near the scintillator surface opposite the photodiode has a relatively long distance to "spread out". The "spreading out" of the light means that the light generated by an x-ray impinging upon the scintillator region directly on a particular photodetector cell may not be detected by that particular photodetector cell, but instead by an adjacent cell. Thus, the spatial resolution of the detector is reduced.

One method used to overcome these problems involves making the scintillator out of glass which can be drawn into fiber bundles. Fiber cladding and interspersed dark fibers can reduce the light spread and thereby improve spatial resolution. However, one disadvantage of this material is that due to the amorphous structure, glass scintillators have inherently low efficiencies of energy conversion of the stimulating x-rays to visible light. The efficiency of an x-ray scintillator material is the percentage of the energy of the absorbed x-rays which is generated as light. Glass scintillators also have relatively poor scintillation properties such as afterglow and radiation damage which limits their utility.

Afterglow in an x-ray detecting scintillator is the phenomena that luminescence from the scintillator due to x-ray excitation can still be observed a long time after the x-ray radiation is absorbed by the scintillator. Upon absorbing x-ray radiation the scintillator will emit light where the intensity of the light decays rapidly at an exponential rate. Additionally, the scintillator will emit a lower intensity light where the light intensity decays much more slowly. The more slowly decaying light is termed afterglow.

Radiation damage in an x-ray scintillator material is the characteristic of the scintillator material in which the quantity of light emitted by the scintillator material in response to the stimulating x-ray radiation changes after the material has been exposed to a high radiation dose.

SUMMARY

In view of the foregoing, it would be desirable to provide a composite optically nonisotropic material which would increase the spatial resolution detection of a photodetector. According to one embodiment of this invention, an optically nonisotropic optical material is provided, which comprises two materials. The composite material includes a transparent bulk optical material, and fibers embedded within the transparent bulk optical material. The transparent bulk optical material may be a polycrystalline material, for example. The fibers are light absorbing or reflecting and substantially parallel to one another and thereby advantageously tend to channel light along the direction of the fibers.

In an embodiment of the invention where the composite optically nonisotropic material is a scintillator material, it would be desirable to provide a material with good energy conversion efficiency, afterglow, and radiation damage properties.

According to another embodiment of the invention, a high spatial resolution x-ray device is provided. The x-ray device includes an x-ray source and an optically nonisotropic composite scintillator material. The optically nonisotropic composite scintillator includes a transparent bulk scintillator material which absorbs x-ray radiation and emits scintillating radiation. The optically nonisotropic composite scintillator further includes fibers embedded with the bulk scintillator material where the fibers are substantially parallel along a direction. The x-ray device has a scintillating radiation detector optically coupled to the composite scintillator for detecting scintillating radiation from the bulk scintillator material. Advantageously, the composite scintillator will tend to channel scintillating light along the fibers and towards the scintillating radiation detector.

According to yet another embodiment of the invention, a high spatial resolution electromagnetic radiation detection device is provided. The radiation detection device includes an optically nonisotropic composite scintillator which comprises a transparent bulk scintillator and fibers embedded within the bulk scintillator. The fibers reflect or absorb scintillating radiation from the bulk scintillator and tend to channel the scintillating radiation towards a scintillating radiation detector optically coupled to the composite scintillator.

According to yet another embodiment of this invention, a process of making an optically nonisotropic composite scintillator material is provided. Powder is formed around sacrificial fibers. The powder and sacrificial fibers are then pressed to form a sacrificial fiber-powder compact. The sacrificial fibers are removed leaving holes in the compact. The powder compact is sintered to form a transparent polycrystalline ceramic, where the transparent polycrystalline ceramic is a scintillator. The holes of the transparent polycrystalline ceramic are filled with a fiber material, where the fiber material in the holes absorbs or reflects scintillating radiation from the transparent polycrystalline ceramic.

DETAILED DESCRIPTION OF THE PREFERRED EMBODIMENTS

Figure 1:
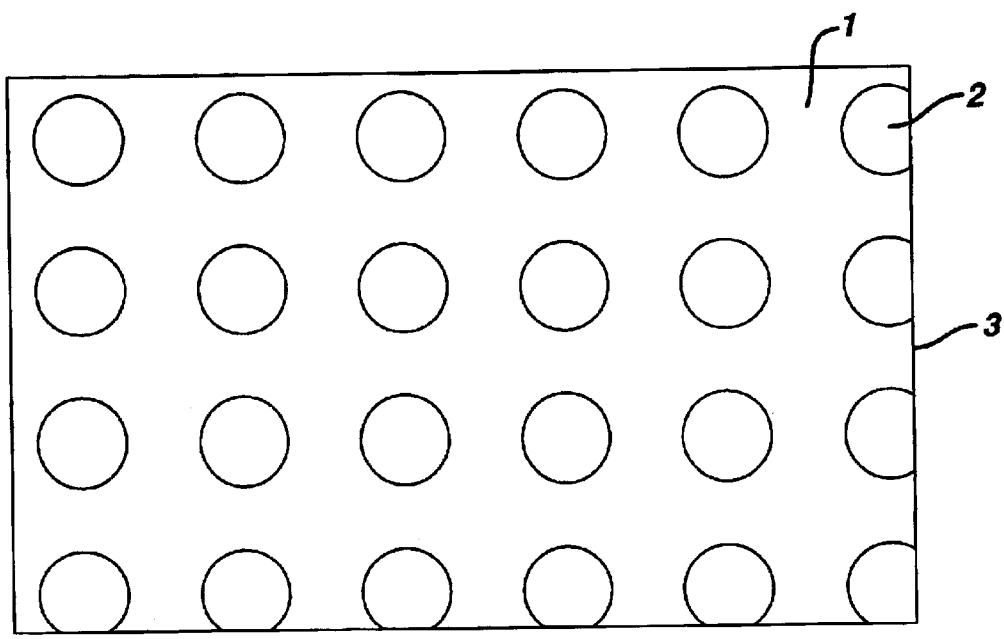
FIG. 1 is a top view schematic of a composite material of an embodiment of this invention.

FIG. 1 is a schematic of the optically nonisotropic composite material 3 of an embodiment of this invention. The composite material 3 comprises two materials, a bulk material 1, and an interstitial fiber material 2 embedded within the bulk material. The bulk material 1 can be a scintillator material, i.e., the bulk material has the property of absorbing energy, such as electromagnetic radiation at one photon energy, and converting the energy into a photon or photons which are emitted at a second photon energy. The bulk material 1 may be an x-ray scintillator material. However, the bulk material need not be an x-ray scintillator-material. For example, the bulk material may absorb incident photons in the ultraviolet (UV) region of the electromagnetic radiation spectrum and emit at a lower photon energy. The bulk material 1 also need not emit in the visible region of the electromagnetic radiation spectrum, but instead the scintillating radiation may be in the infra-red (IR), near IR, or UV region, for example.

Examples of x-ray scintillator materials for the bulk material 1 include yttria-gadolinia $(Y,Gd)_2O_3$ based materials, and $Gd_2O_2S$ based materials. However, the specific scintillator material used for the bulk material 1 is not critical because it would be expected that most scintillator materials would exhibit scintillating light spread out, and would therefore benefit from including the fiber material 2 embedded within the bulk material 1.

The cross-sectional shape of the fibers 2 as depicted in FIG. 1 is circular. However, the cross-sectional shape of the fibers need not be circular, but may have other cross-sectional shapes such as square, hexagonal, etc.

The fibers 2 are made of a material which typically has one or both of two functions. According to a possible first function, the fibers 2 may help to redirect the scintillating radiation that is not traveling parallel to the fibers in a direction that is roughly parallel or more parallel to the fibers. Thus, the scintillating radiation is channeled to some extent along the fibers. The fibers either absorb the scintillating radiation, or have a reflecting surface to reflect the scintillating radiation. This channeling function improves the spatial resolution of a detection system using the scintillator as the scintillator thickness is increased, thereby allowing for a thicker scintillator and the corresponding advantage of increased x-ray absorption.

If the fibers have a surface which reflects the scintillating radiation, it is preferred that scintillating radiation is scattered by the reflecting-surface instead of specularly reflected in order to reduce the number of reflections back and forth between the fibers. However, the fiber reflecting surface may specularly reflect the scintillating radiation.

According to a possible second function of the fibers, the fibers may act as a good x-ray stopping material which helps prevent "punch-through" of the x-rays through the composite material 3. In that regard, the fibers may be made of a material which has the same or a higher density or higher atomic number then that of the bulk scintillator material. If the composite scintillator material has fibers with good stopping power, the thickness of the composite scintillator may be decreased while still stopping substantially all of the x-rays. Thus, if the composite scintillator material is between a photodetector and the impinging x-rays, the underlying detector may be prevented from a high exposure to x-rays, while at the same time keeping the scintillator material thickness smaller and thereby increasing spatial resolution.

Examples of materials for the fibers include epoxy/$TiO_2$, a light scattering material, and epoxy/carbon black, a light absorbing material. Metal films or coatings, which are good light reflectors, such as silver, aluminum, and gold may also be used. Dielectric stacks which can be designed to reflect at a particular scintillating radiation wavelength are also useful as the fiber material. In the case of dielectric stacks, the fibers formed would have a coating of alternating dielectric layers of the dielectric stack.

The dimensions of the composite material will depend upon the particular application. In this regard, it is noted that FIG. 1 is not necessarily drawn to scale, and the ratio of the fiber diameter or distance between fibers to the composite material thickness may vary. In general the fiber material should preferably comprise a minority phase, i.e., the total volume of the fibers 2 will be less than the volume of the bulk material 1. This is because only the scintillator material effectively absorbs the stimulating or exciting radiation of interest, i.e. x-rays, and then emits scintillating radiation which is then detected. As the fractional volume of the fiber material is increased relative to the bulk scintillator material, less of the stimulating radiation of interest is absorbed because there is less scintillator material to absorb the stimulating radiation.

The distance between the fibers depends on the amount of scintillation light channeling required. In general, the closer the fibers are to each other, the greater the channeling of the scintillator radiation. For x-ray scintillator applications appropriate distances between the fibers may be in the range 20–200 microns, while appropriate fiber diameters may be in the range 10–150 microns.

Figure 2:
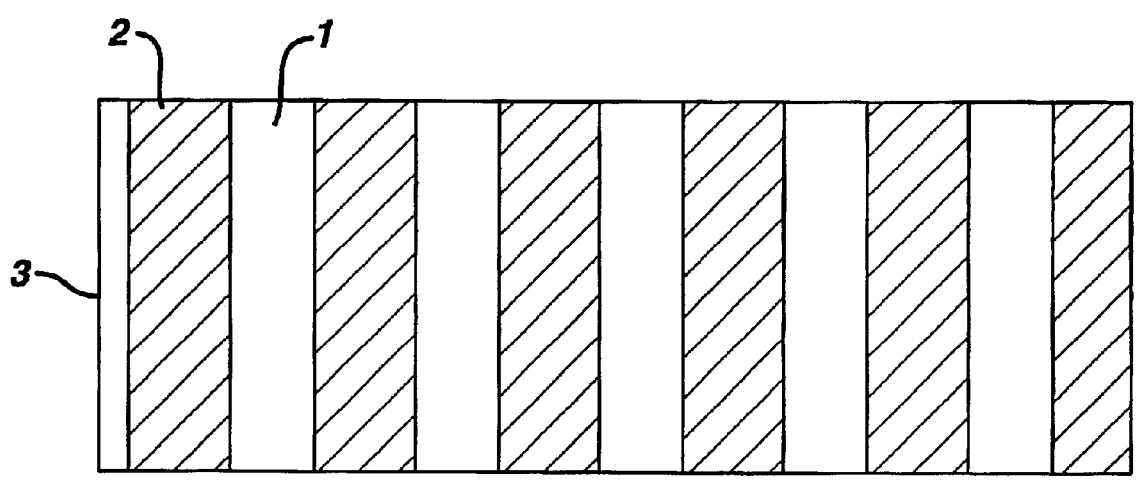
FIG. 2 is a side view of a composite material of an embodiment of this invention where the fibers are oriented perpendicular to the top surface of the bulk material.

FIG. 2 is a cross-sectional view of an embodiment of the present invention. The fibers 2 pass preferably all the way through or at least substantially all the way through the bulk material 1. The fibers generally travel in a particular direction and are substantially parallel to one another. Thus, the composite material will have optically non-isotropic properties. Specifically, in the embodiment of FIG. 2, scintillating radiation traveling parallel or substantially parallel to the direction of the fibers will not behave in the same fashion as light traveling perpendicular or substantially perpendicular to the fibers because the fibers will tend to channel the scintillating radiation along the direction of the fibers.

In the embodiment of the invention as shown in FIG. 2, the fibers run in a direction which is perpendicular to a top surface 4 of the bulk material 1. The embodiment of FIG. 2 is most preferred when the stopping power of the composite material 3 is not a concern. In this fashion, scintillating light may be channeled directly to an underlying detector.

Figure 3:
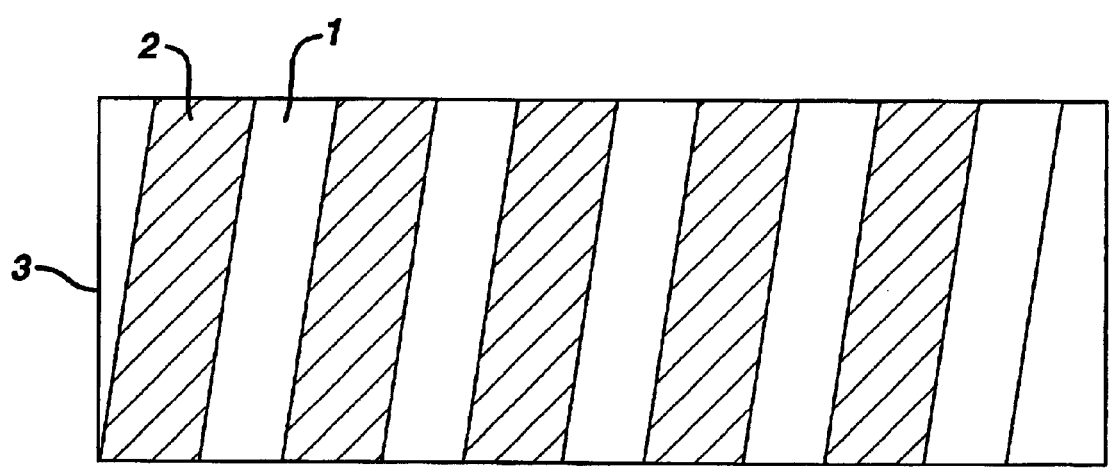
FIG. 3 is a side view of a composite material of an embodiment of this invention where the fibers are oriented at an angle relative to perpendicular to the top surface of the bulk material.

FIG. 3 is a cross-sectional view of another embodiment of the present invention. Like the embodiment of FIG. 2, the fibers 2 in FIG. 3 preferably pass all the way through, or at least substantially all the way through the bulk material. Also, like the embodiment of FIG. 2, in the embodiment of FIG. 3, the fibers generally travel in a particular direction and are substantially parallel to one another, and the composite material will have optically non-isotropic properties.

However, in the embodiment of FIG. 3, the fibers run in a direction which is not perpendicular to a top surface 4 of the bulk material. Instead, the fibers are angled relative to the top surface. A typical range of angles is 0–45°, and more typically 5–15°. This embodiment is advantageous, for example, when the composite material must have stopping power to prevent punch-through, such as for a composite where the bulk material is a high energy x-ray scintillator material and high energy x-rays are the stimulating radiation of interest. X-ray radiation incident perpendicular to the top surface of the composite material for this embodiment will less likely be able to travel directly through the composite material without encountering a fiber than in the embodiment of FIG. 2. Thus, in this embodiment it is preferred that the fiber material have good stopping power. In practice, the angle of the fibers relative to the perpendicular need not be large because a small angle will be sufficient to ensure that an x-ray will likely encounter a fiber. In fact, a large angle is not preferred, because the scintillating radiation will not be channeled as directly to the bottom surface of the composite material and hence to a photodetector when the fibers are at a large angle.

Any known technique for synthesizing the optically nonisotropic composite material may be employed. A suitable technique for synthesizing the optically nonisotropic composite material of the present invention will now be described. In this embodiment the bulk material of the optically nonisotropic composite material is a polycrystalline ceramic material. Techniques for forming bulk polycrystalline scintillator material from powder are known, for example, as disclosed in U.S. Pat. Nos. 4,473,513, 4,518, 546, 4,769,353, and 5,521,387. The polycrystalline ceramic matrix is initially a powder with a particle size distribution and agglomeration such that it can be sintered to transparency.

In accordance with a method for forming the polycrystalline ceramic material of $(Y,Gd)_2O_3$ scintillator material, submicron-to-micron powders of yttria $(Y_2O_3)$ and gadolinia $(Gd_2O_3)$ having purities of, for example, 99.99 percent to 99.9999 percent are mixed with the desired rare earth luminescent activators, such as Eu, Nd, Yb, Dy, Tb, or Pr, in the form of oxides, oxalates, carbonates, or nitrates and mixtures thereof. The mixing of the selected constituents may be carried out, for example, in an agate mortar and pestle or in a ball mill using water, heptane, or an alcohol (such as ethyl alcohol) as liquid vehicles. Dry milling may also be used for both mixing and breakup of powder aggregates. If dry milling is employed, a grinding aid such as 1 to 5 weight percent of stearic acid or oleic acid should be employed to prevent powder packing or sticking inside the ball mill. Transparency promoters such as SrO, $YbO_3$, $Ta_2O_5$, $ZrO_2$, and $ThO_2$ may also be added in the form of oxides, nitrates, carbonates, or oxalates before ball milling. If the various additives are nitrates, carbonates, or oxalates, a calcining step is generally required to obtain the corresponding oxides prior to fabrication of the ceramic scintillator.

If Eu is the luminescent activator used, the addition of ytterbium oxide $(Yb_2O_3)$, itself an activator in the yttria-gadolinia host if used alone, results in the reduction of undesirable afterglow. SrO oxide may also be used as an additive to reduce afterglow. Other additives which may be used to reduce afterglow include $Pr_6O_{11}$ and TbO.

Following the preparation of the selected powder composition, the powder is coated onto sacrificial polymer or graphite fibers of appropriate dimensions using a solvent, and either dip coating or spray coating techniques. The coated sacrificial fibers are then warmed to evaporate the solvent, and bundled such that the fibers are parallel. Alternatively, the fibers are held, and then the powder is injected around the fibers.

The sacrificial fiber-powder composition is then formed into a sacrificial fiber-powder compact containing the sacrificial fibers by either die pressing, or die pressing followed by isostatic pressing to further increase green density. A die material which is inert with respect to the scintillator constituents is preferred to avoid undesired reactions and contaminations. Suitable die materials include alumina, silicon carbide, and metals such as molybdenum, hardened steel, or nickel-based alloys. The powder compacts are formed by die pressing at pressures of between 3,000 psi and 15,000 psi (pounds per square inch). Alternatively, the die pressed powder compacts may be isostatically pressed at between about 10,000 and 60,000 psi (pounds per square inch) to further increase powder compact green density. If any grinding aids or compaction aids (lubricants, such as waxes) have been used, an oxidation treatment to remove all organic additives can then be employed.

Once the sacrificial fiber-powder composition has been formed into a sacrificial fiber-powder compact, the sacrificial fibers are removed. If necessary at least one end of the sacrificial fiber-powder compact may need to be removed in order to expose at least one end of the fibers for the sacrificial fiber removal process. At least one end of the fibers may be exposed by, for example, grinding or polishing the sacrificial fiber-powder compact. Once at least one end of the sacrificial fibers are exposed, the fibers may be removed, for instance, by heating the sacrificial fiber-powder compact to temperatures sufficient to decompose the polymer sacrificial fibers or oxidize the graphite fibers. For example, temperatures of 700–900° C. are typically sufficient to remove the sacrificial fibers. Alternatively, the fibers may be removed by placing the sacrificial fiber-powder compact in a solution to dissolve the sacrificial fibers. The sacrificial fiber removal process will result in a compacted ceramic powder with small dimension holes throughout all or substantially all of its thickness.

The compacted ceramic powder with small dimension holes is then sintered to produce a transparent polycrystalline ceramic with good scintillator properties. During the sintering phase, the compact is heated in a high temperature furnace, for example, such as a tungsten furnace, in vacuum or a reducing atmosphere such as a wet hydrogen atmosphere (dew point about 23° C., for example) at a rate of 100° C. to 700° C. per hour to a sintering temperature of between 1800° C. and 2100° C. The sintering temperature is then held from 1 hour to about 30 hours to cause extensive densification and optical clarity development. Upon termination of the sintering step, the compact is cooled from the sintering temperature to room temperature over a period of time ranging from about 2 to 10 hours. Alternatively, the polycrystalline ceramic may be prepared by a heating sequence which includes a hold at a temperature lower than the final sintering temperature. Also, the sacrificial fibers may be removed by heating during the sintering instead of prior to sintering. Thus, the steps of removing the sacrificial fibers and sintering may be simultaneous.

Once the compact has been sintered to form a transparent polycrystalline ceramic, the holes may then be filled with fiber material which absorbs or reflects electromagnetic radiation, or which has good x-ray stopping power if desired. Appropriate fiber material which has good x-ray stopping power includes high density metals such as W or Pb, and high density oxides such as $HfO_2$, $WO_3$ and $Pb_2O_3$. If the transparent polycrystalline material is a scintillator material, and a fiber material which absorbs or reflects electromagnetic radiation is desired, the fiber material which absorbs or reflects scintillating radiation from the scintillator material is chosen. As mentioned above, appropriate materials for the fibers include epoxy/$TiO_2$, epoxy/carbon black, metals such as silver, aluminum, and gold, and dielectric stacks. The epoxy compositions may be formed in the holes by appropriate techniques such as injecting the holes with an epoxy precursor material and then heating the precursor to solidify and cure it.

The metals may be formed in the holes by an appropriate technique, for example, chemical vapor deposition, or by placing the sintered material in solution and using plating techniques. The dielectric stack may be formed by alternately forming the dielectric layers of the dielectric stack on the surface of the holes by, for example, chemical vapor deposition techniques.

Once the holes of the bulk transparent polycrystalline ceramic material are filled with fiber material to form the composite material, the composite material may be further processed. For instance, the top and bottom surfaces of the composite may be polished to remove any fiber material on the outer surface, other than the hole surface, of the polycrystalline ceramic. Polishing also serves to beneficially form a smooth optical surface. Alternatively, if only the top or bottom surface of the composite material requires polishing, only the surface which requires polishing need be polished. If is desired that the embedded fibers are angled relative to the top surface of the composite material, the composite material is oriented appropriately during the cutting and polishing processes. The composite material may also be diced into smaller sections appropriate for the particular application of the composite.

Figure 4:
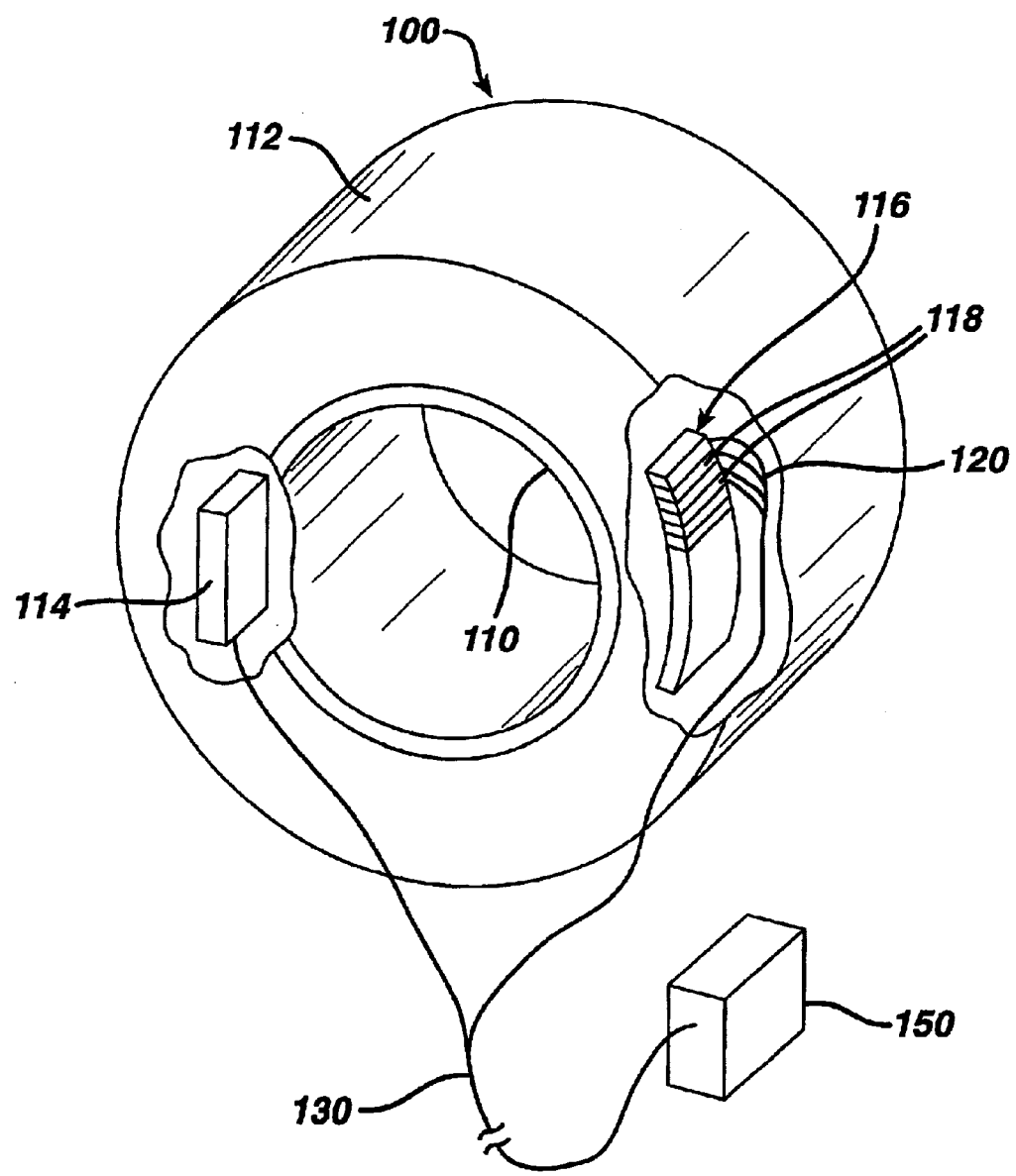
FIG. 4 is a stylized perspective of a portion of a CT machine containing a composite material scintillator according to another embodiment of this invention.

FIG. 4 shows another embodiment of the present invention, where a composite scintillator material forms part of a high spatial resolution radiation detection device. Specifically, this particular embodiment of the invention includes the composite scintillator in a computed tomography (CT) scanning system.

This CT scanning system 100 comprises a cylindrical enclosure in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used to connect the electronics on the gantry to the rest of the system. The electronics on the gantry include an x-ray source 114 which preferably produces a fan x-ray beam which is incident on a scintillation detector system 116 mounted on the gantry on the opposite side of the cylinder 110. The fan pattern of the x-ray source is disposed in the plane defined by the x-ray source and the scintillation detector system 116.

The scintillation detector system 116 is typically very narrow or thin in the direction perpendicular to the plane of the x-ray fan beam. Each cell 118 of the scintillation detector system incorporates a solid transparent bar of a composite x-ray scintillator material and a photodetector diode optically coupled to that scintillator bar. Alternatively, the scintillator material need not be formed of a number of individual bars, one for each cell. Instead, there may be multiple cells for each scintillator bar, each cell with a photodetector diode. This is possible because the scintillator material can channel the scintillating radiation. Appropriate composite x-ray scintillator materials are described above with respect to the embodiments of FIGS. 1, 2, and 3.

The output from each photodetector diode is connected to an operational amplifier which is mounted on the gantry. The output from each operational amplifier is connected either by individual wires 120 or by other electronics to the main control system 150 for the computed tomography system. In the illustrated embodiment, power for the x-ray source and signals from the scintillation detector are carried to the main control system 150 by a cable 130. The use of the cable 130 generally limits the gantry to a single full revolution before returning to its original position.

Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light, i.e., scintillating radiation, which is detected by the photodetector diode and thereby converted to an electrical signal as a means of converting the incident x-rays to electrical signals which may be processed for image extraction and other purposes.

Figure 5:
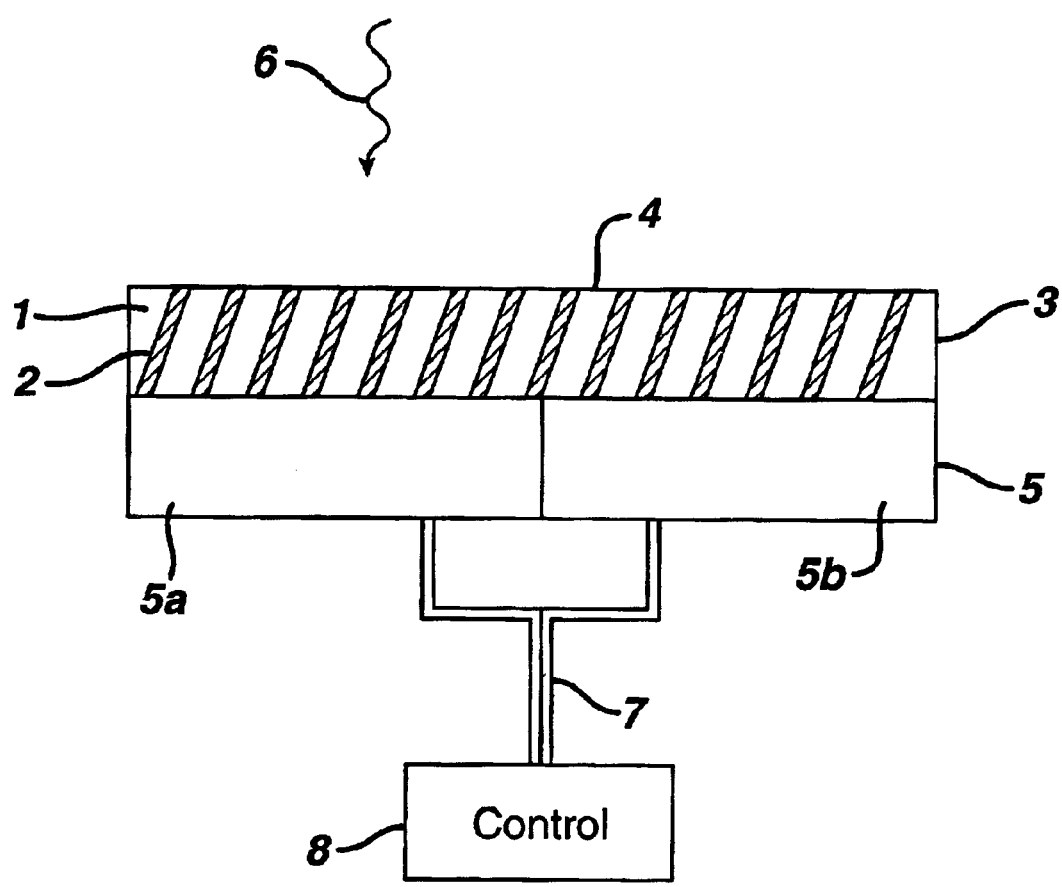
FIG. 5 is a schematic of a high spatial resolution electromagnetic radiation detection system according to yet another embodiment of this invention.

FIG. 5 shows another embodiment of the invention, a high spatial resolution electromagnetic radiation detection system. The electromagnetic radiation system of FIG. 5 includes a transparent optically nonisotropic composite material 3 such as the composite material discussed above with respect to the embodiments of FIGS. 1, 2, and 3. The composite material 3 includes fibers 2 for absorbing or reflecting scintillating light emitted from the bulk scintillator material 1. The composite material 3 is optically coupled to a scintillating radiation detector 5 comprising detector cells 5a and 5b. In practice the scintillating radiation detector 5 may comprise an array of detector cells. The radiation detector 5 is shown with only two cells 5a and 5b for simplicity. Alternatively the radiation detector 5 may comprise a single photodetector cell, instead of an array of cells. The bulk scintillator material absorbs the electromagnetic radiation 6 of interest. For example, if it is desired to detect ultraviolet (UV) electromagnetic radiation, a scintillator material is chosen which has good ultraviolet radiation energy conversion properties.

The fibers 2 may run either perpendicular to or at an angle to the top surface 4 of the photodetector cells. When electromagnetic radiation 6 impinges upon a region of the composite material above one of the cells, such as cell 5a, the bulk scintillator material 1, which is above that cell, may absorb the electromagnetic radiation, and convert the electromagnetic radiation to scintillating radiation. The fibers 2 operate to channel the scintillating radiation to the underlying detector cell. Because the scintillating radiation is channeled, and does not travel to the adjacent cell, the resolution of the electromagnetic radiation detector of FIG. 4 is increased.

The photodetector cells 5a and 5b may be, for instance, photodiodes. The output signals of the photodetector cells is coupled to a controller 8, by means of individual wires or other electronics 7.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A high spatial resolution x-ray device comprising:
an x-ray source;
an optically nonisotropic composite scintillator material including
a transparent bulk scintillator material for absorbing x-ray radiation from the x-ray source and emitting scintillating radiation, and
fibers for absorbing or reflecting the scintillating radiation, wherein the fibers are embedded within the transparent bulk scintillator material and are substantially parallel to a first direction; and
a scintillating radiation detector optically coupled to the optically nonisotropic composite scintillator material for detecting the scintillating radiation.

2. The high spatial resolution x-ray device of claim 1, wherein the scintillating-radiation detector comprises an array of photodetector cells.

3. The high spatial resolution x-ray device of claim 1, wherein the scintillating radiation detector comprises at least one photodiode.

4. The high spatial resolution x-ray device of claim 3, wherein the at least one photodiode is an array of photodiodes.

5. The high spatial resolution x-ray device of claim 2, further comprising:
a control system coupled to the array of photodetector cells for receiving signals output from the photodetector cells in response to the scintillating radiation.

6. The high spatial resolution x-ray device of claim 1, wherein the first direction is angled relative to the perpendicular of a top surface of the transparent bulk scintillator material.

7. The high spatial resolution x-ray device of claim 1, wherein the light absorbing or reflecting fibers comprise a material selected from the group consisting of epoxy/$TiO_2$, epoxy/carbon black, silver, aluminum, and gold.

8. The high spatial resolution x-ray device of claim 1, wherein the transparent bulk scintillator material is a polycrystalline ceramic.

9. The high spatial resolution x-ray device of claim 1, wherein the transparent bulk scintillator material is one of a $(Y,Gd)_2O_3$ based material, and a $Gd_2O_2S$ based material.

10. The high spatial resolution x-ray device of claim 1, wherein the transparent bulk scintillator material is a $(Y,Gd)_2O_3$ based material comprising an activator, wherein the activator is at least one selected from the group consisting of Eu, Nd, Yb, Dy, Tb and Pr.

11. The high spatial resolution x-ray device of claim 5, wherein the transparent bulk scintillator material is a $(Y,Gd)_2O_3$ based material comprising an activator, and wherein the activator is at least one selected from the group consisting of Eu, Nd, Yb, Dy, Tb and Pr.

12. A high spatial resolution electromagnetic radiation detection device comprising:
an optically nonisotropic composite scintillator material including an optically transparent bulk scintillator material for absorbing the electromagnetic radiation and emitting scintillating radiation, and fibers within the bulk scintillator material, wherein the fibers absorb or reflect the scintillating radiation and are substantially parallel to a first direction; and
a scintillating radiation detector optically coupled to the optically nonisotropic composite scintillator material for detecting the scintillating radiation.

13. The high spatial resolution electromagnetic radiation detection device of claim 12, wherein the scintillating radiation detector comprises an array of photodetector cells.

14. The high spatial resolution electromagnetic radiation detection device of claim 12, wherein the scintillating radiation detector comprises at least one photodiode.

15. The high spatial resolution electromagnetic radiation detection device of claim 12, wherein the at least one photodiode is an array of photodiodes.

16. The high spatial resolution electromagnetic radiation detection device of claim 13, further comprising:
a control system coupled to the array of photodetector cells for receiving signals output from the photodetector cells in response to the scintillating radiation.

17. The high spatial resolution electromagnetic radiation detection device of claim 12, wherein the first direction is angled relative to the perpendicular of a top surface of the optically transparent bulk scintillator material.

18. The high spatial resolution electromagnetic radiation detection device of claim 12, wherein the light absorbing or reflecting fibers comprise a material selected from the group consisting of epoxy/$TiO_2$, epoxy/carbon black, silver, aluminum, and gold.

19. The high spatial resolution electromagnetic radiation detection device of claim 12, wherein the optically transparent bulk scintillator material is a polycrystalline ceramic.

20. The high spatial resolution electromagnetic radiation detection device of claim 12, wherein the optically transparent bulk scintillator material is one of a $(Y,Gd)_2O_3$ based material, and a $Gd_2O_2S$ based material.

21. The high spatial resolution electromagnetic radiation detection device of claim 12, wherein the optically transparent bulk scintillator material is a $(Y,Gd)_2O_3$ based material comprising an activator, wherein the activator is at least one selected from the group consisting of Eu, Nd, Yb, Dy, Tb and Pr.

22. The high spatial resolution electromagnetic radiation detection device of claim 16, wherein the optically transparent bulk scintillator material is a $(Y,Gd)_2O_3$ based material comprising an activator, wherein the activator is at least one selected from the group consisting of Eu, Nd, Yb, Dy, Tb and Pr.

* * * * *